(12) United States Patent
Dingmann

(10) Patent No.: US 11,371,923 B2
(45) Date of Patent: Jun. 28, 2022

(54) AUTOMATIC SYSTEM COMPLIANCE ESTIMATION AND CORRECTION FOR MECHANICAL TESTING SYSTEMS

(71) Applicant: Waters Technologies Corporation, Milford, MA (US)

(72) Inventor: David L. Dingmann, Saint Paul, MN (US)

(73) Assignee: WATERS TECHNOLOGIES CORPORATION, Milford, MA (US)

( * ) Notice: Subject to any disclaimer, the term of this patent is extended or adjusted under 35 U.S.C. 154(b) by 388 days.

(21) Appl. No.: 16/149,546

(22) Filed: Oct. 2, 2018

(65) Prior Publication Data

US 2019/0101481 A1 Apr. 4, 2019

Related U.S. Application Data

(60) Provisional application No. 62/567,539, filed on Oct. 3, 2017.

(51) Int. Cl.
*G01N 3/62* (2006.01)
*G01N 3/08* (2006.01)
(Continued)

(52) U.S. Cl.
CPC .............. *G01N 3/62* (2013.01); *G01N 3/08* (2013.01); *G01N 3/22* (2013.01); *G01N 3/20* (2013.01);
(Continued)

(58) Field of Classification Search
CPC .. G01N 3/62; G01N 3/22; G01N 3/08; G01N 3/20; G01N 2203/0682; G01N 2203/021; G01N 2203/0676; G01N 2203/0252
See application file for complete search history.

(56) References Cited

U.S. PATENT DOCUMENTS 3,784,798 A * 1/1974 Beadle ............... G05B 19/4163
700/173
3,836,757 A 9/1974 Nachtigal et al.
(Continued)

FOREIGN PATENT DOCUMENTS

CN 2682407 Y * 3/2005
EP 2522980 A2 11/2012
(Continued)

OTHER PUBLICATIONS

A. Farsi and et al, "Full deflection profile calculation and Young's modulus optimization for engineered high performance materials", Scientific Reports | 7:46190 | DOI: 10.1038/srep46190, www.nature.com/scientificreports; Apr. 11, 2017 (Year: 2017).*

(Continued)

*Primary Examiner* — Douglas Kay
(74) *Attorney, Agent, or Firm* — Schmeiser, Olsen & Watts LLP

(57) ABSTRACT

An error compensation system and method may include applying a mechanical load to a reference sample to obtain a load measurement signal from the load sensor and a displacement measurement signal from the displacement sensor, calculating a transfer function to create a load filter and a displacement filter to be applied to the load measurement signal and the displacement measurement signal, respectively, applying the load filter to the load measurement signal to calculate a load compensation value, and applying the displacement filter to the displacement measurement signal to calculate a displacement compensation value, and determining the compensated value by comparing the load compensation value with the displacement compensation value, wherein the compensated value is determined prior to testing a specimen so that the compensated value is used to (Continued)

automatically correct a measured deflection of the specimen to arrive at an actual specimen deflection.

34 Claims, 13 Drawing Sheets

(51) Int. Cl.
*G01N 3/22* (2006.01)
*G01N 3/20* (2006.01)

(52) U.S. Cl.
CPC .................. *G01N 2203/021* (2013.01); *G01N 2203/0252* (2013.01); *G01N 2203/0676* (2013.01); *G01N 2203/0682* (2013.01)

(56) References Cited

U.S. PATENT DOCUMENTS

| | | | | |
|---|---|---|---|---|
| 5,431,062 | A * | 7/1995 | Baratta | G01N 3/04 73/856 |
| 8,768,641 | B2 * | 7/2014 | Lindenstruth | G01M 13/027 702/113 |
| 9,495,038 | B2 * | 11/2016 | Young | G06F 3/044 |
| 9,562,960 | B2 * | 2/2017 | Kolipaka | A61B 5/416 |
| 10,571,379 | B2 * | 2/2020 | Oliver | G01B 7/22 |
| 2004/0020276 | A1 | 2/2004 | Kwon et al. | |
| 2005/0120802 | A1 | 6/2005 | Schulz | |
| 2005/0267695 | A1 | 12/2005 | German | |
| 2010/0280787 | A1 | 11/2010 | White et al. | |
| 2011/0092798 | A1 * | 4/2011 | Kolipaka | G01R 33/56358 600/410 |
| 2011/0288791 | A1 * | 11/2011 | Jeppesen | G01N 3/38 702/42 |
| 2012/0131702 | A1 | 5/2012 | Shi et al. | |
| 2014/0345358 | A1 * | 11/2014 | White | G01P 21/02 73/1.37 |
| 2016/0224158 | A1 * | 8/2016 | Young | G06F 3/044 |
| 2016/0274142 | A1 * | 9/2016 | White | G01N 3/08 |
| 2017/0284912 | A1 * | 10/2017 | Oliver | G01N 3/42 |
| 2019/0107472 | A1 | 4/2019 | Alstrin | |

FOREIGN PATENT DOCUMENTS

| | | |
|---|---|---|
| GB | 2282228 A | 3/1995 |
| GB | 2467184 A | 7/2010 |
| WO | 2007004993 A1 | 1/2007 |

OTHER PUBLICATIONS

A R Plummer, "Control techniques for structural testing: a review", Proc. IMechE vol. 221 Part I: J. Systems and Control Engineering, JSCE295 © IMechE 2007 (Year: 2007).*

M. Shang, "The Experimental Test and FEA of a PKM (Exechon) in a Flexible Fixture Application for Aircraft Wing Assembly", Proceedings of the 2011 IEEE International Conference on Mechatronics and Automation Aug. 7-10, Beijing, China (Year: 2011).*

International Preliminary Report on Patentability in PCT/US2018/ 05925 dated Apr. 23, 2020.

International Preliminary Report on Patentability in PCT/US2018/ 053899 dated Apr. 16, 2020.

International Preliminary Report on Patentability in PCT/US2018/ 053912 dated Apr. 23, 2020.

Plummer, A.R. "Control techniques for structural testing: a review," Proceedings of the Institution of Mechanical Engineers, Journal of Engineering in Medicine, Mar. 1, 2007, vol. 221, No. 2, pp. 139-169.

International Search Report & Written Opinion in PCT/US2018/ 053899 dated Jan. 17, 2019; 15 pages.

International Search Report & Written Opinion in PCT/US2018/ 053912 dated Jan. 22, 2019; 13 pages.

International Search Report & Written Opinion in PCT/US2018/ 053952 dated Jan. 18, 2019; 16 pages.

Non-Final Office Action in U.S. Appl. No. 16/149,615 dated Oct. 7, 2020.

Office Action (dated Jan. 26, 2021) for U.S. Appl. No. 16/149,695, filed Oct. 2, 2018.

Notice of Allowance in U.S. Appl. No. 16/149,615 dated Mar. 23, 2021.

Notice of Allowance in U.S. Appl. No. 16/149,695 dated May 12, 2021.

* cited by examiner

AUTOMATIC SYSTEM COMPLIANCE ESTIMATION AND CORRECTION FOR MECHANICAL TESTING SYSTEMS

RELATED APPLICATION

This application claims the benefit of the earlier filing date of U.S. Provisional Patent Application No. 62/567,539, filed Oct. 3, 2017 and titled "Automatic System Compliance Estimation and Correction for Mechanical Testing Systems," the entirety of which is incorporated herein by reference.

TECHNICAL FIELD

The present invention relates to a mechanical testing system and methods for error compensation, and more specifically to embodiments of an error compensation system for correcting errors attributable to parameters of a mechanical testing device.

BACKGROUND

Mechanical testing systems are used for calculating, testing, and measuring material properties and parameters of various specimens. As part of the tests, the mechanical testing system may apply various loads, including an axial load, a torsion load, a tensile load, a compression load, etc., to the specimen. However, the components of the mechanical testing device are also subjected to those applied loads, leading to sources of error when measuring the effects of the specimen.

SUMMARY

An aspect relates generally to a method for determining a compensated value attributable to a deflection of a mechanical testing system, the mechanical testing system including at least one fixture, a frame, a load sensor, and a displacement sensor, the method comprising: applying a mechanical load to a reference sample mechanically coupled to the at least one fixture to obtain a load measurement signal from the load sensor and a displacement measurement signal from the displacement sensor, calculating a transfer function converting the load measurement signal and the displacement measurement signal to a frequency domain to create a load filter and a displacement filter to be applied to the load measurement signal and the displacement measurement signal, respectively, applying the load filter to the load measurement signal to calculate a load compensation value, and applying the displacement filter to the displacement measurement signal to calculate a displacement compensation value, and determining the compensated value by comparing the load compensation value with the displacement compensation value, wherein the compensated value is determined prior to testing a specimen so that the compensated value is used to automatically correct a measured deflection of the specimen to arrive at an actual specimen deflection.

Further aspects relate to a method, a mechanical testing system, and a computer program product for determining a compensated value attributable to a deflection of the mechanical testing system, the method comprising: receiving, by the processor, a load measurement signal from the load sensor, and a displacement measurement signal from the displacement sensor, in response to an actuator of the mechanical testing system applying a mechanical load to a reference sample mechanically coupled to at least one fixture of the mechanical testing system, creating, by the processor, a load filter and a displacement filter to be applied to the load measurement signal and the displacement measurement signal, respectively, using a transfer function, calculating, by the processor, a load compensation value by applying the load filter to the load measurement signal, and a displacement compensation value by applying the displacement filter to the displacement measurement signal, and comparing, by the processor, the load compensation value with the displacement compensation value to determine the compensated value prior to testing a specimen so that the compensated value is used to automatically correct a measured deflection of the specimen to arrive at an actual specimen deflection.

DETAILED DESCRIPTION

When measuring one or more mechanical properties of a material, frequently a significant parameter of interest is a stiffness (e.g. storage modulus) of a specimen under test, as well as a portion of energy lost during a cycle (i.e. loss modulus), which can be used to calculate a ratio (tan(δ)) between the loss modulus and the storage modulus. Based on a specimen geometry, the storage modulus can be determined by measuring the specimen's stiffness. When measuring stiffness, it is typical that two measurements are made simultaneously, using a loading system: a load applied to the sample, and a deflection of the sample in response to that load. The ratio tan(δ) can be computed from a phase difference between the load measurement signal and the displacement measurement signal. One of the primary sources of error is due to stiffness or a compliance (i.e. 1/stiffness) of the mechanical testing device. As a given load is applied, both the specimen and the mechanical testing device experience that load, and undergo some deformation. As a result, the resulting displacement measurement includes both the specimen deformation and the testing system deformations. From the point of view of attempting to measure a stiffness of the specimen, the system deformations are a source of error.

Every component of a loading path within the test system contributes to the overall compliance of the testing system. Some of the typical components are a loading frame, or primary structure, of the system, a load measurement device, which is typically measures load as being proportional to its compliance, and fixtures that hold or support the specimen during a testing operation. Of these, the compliance or deformation of the testing system and the load measurement device (e.g. sensor) may not vary from one test to another. However, a given test system may be used to test many different types and geometries of specimens, and in various orientations. Accordingly, it is valuable to give a user a tool to quickly and accurately assess the overall compliance of the testing system before running a test on a desired material/specimen. An error correction or compensation for the compliance, deflection, and/or displacement of the testing system may be used by the test system computer to correct for these errors automatically, providing the user with more accurate data on the specimen.

Figure 1:
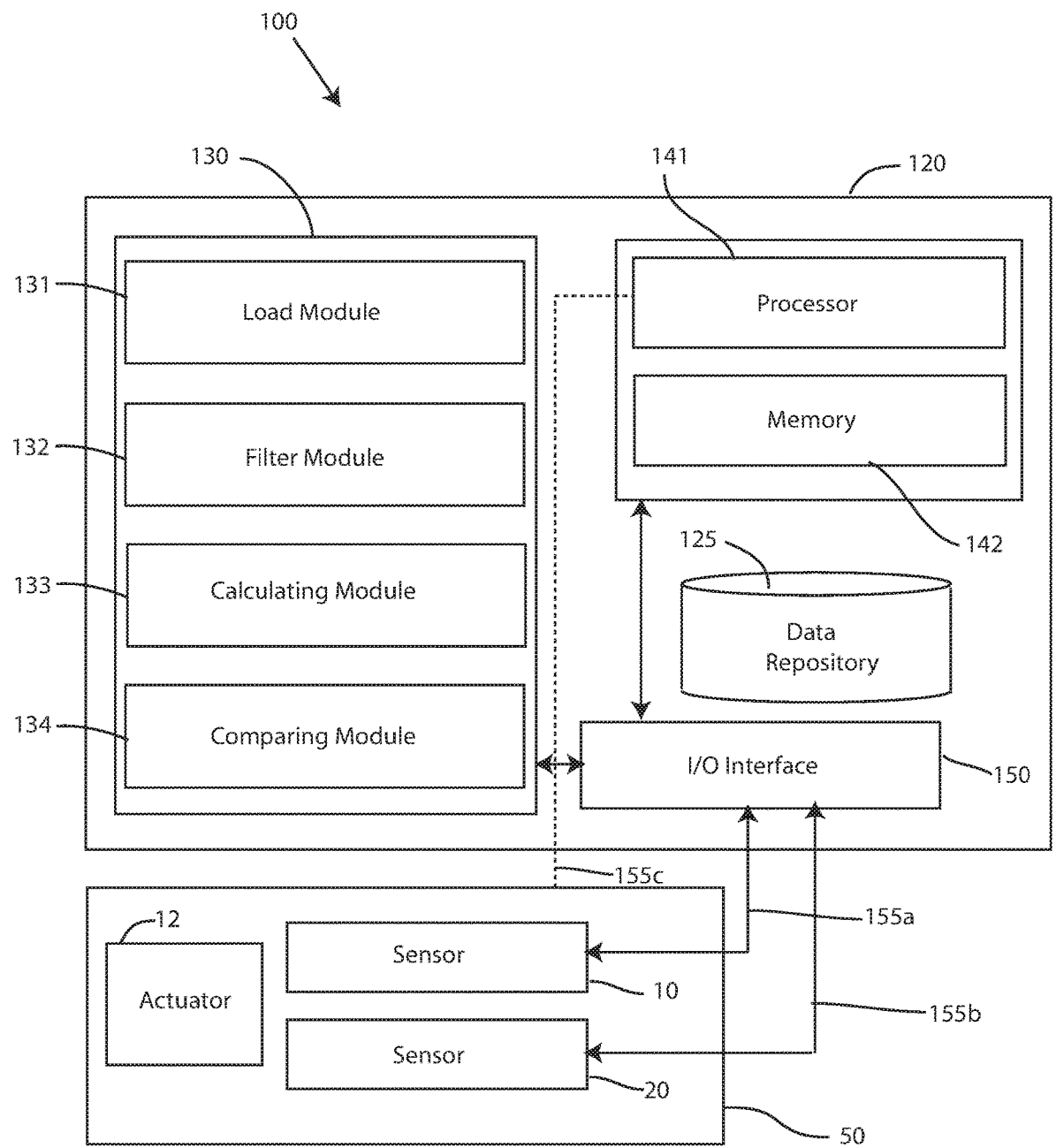
FIG. 1 depicts a block diagram of an error compensation system, in accordance with embodiments of the present invention.

Referring to the drawings, FIG. 1 depicts a block diagram of error compensation system 100, in accordance with embodiments of the present invention. Embodiments of the error compensation system 100 may be a system for correcting errors attributable to parameters of a mechanical testing device 50. Embodiments of the error compensation system 100 may be useful for ensuring accurate measurements of physical properties of specimens by eliminating errors due to measurements attributable to the mechanical testing device 50 (i.e. components thereof). For example, a mechanical testing device 50 may be factory calibrated before arriving at a user location, but due to additional assembly and set-up at the end user location, the mechanical testing device 50 may need to be recalibrated to account for system compliance. In addition, various fixtures may be used for different types of testing, wherein each fixture may experience an applied load differently.

Embodiments of the error compensation system 100 may be an error compensation system, an error calculation and correction system, an error estimation and correction system, an automatic error correction system, a compliance detection and correction system, a stiffness testing system, a displacement testing system, a mechanical testing system for testing materials, and the like. Embodiments of the error compensation system 100 may include a computing system 120 and a mechanical testing device 50. Embodiments of the computing system 120 may be a computer system, a computer, personal computer, a desktop computer, a cellular phone, a user mobile device, a user computing device, a tablet computer, a dedicated mobile device, a laptop computer, a dedicated processor or microcontroller hardware, other internet accessible device or hardware and the like capable of being coupled to a mechanical testing device 50. Embodiments of the computing system 120 may include hardware functionality such as a speaker for emitting a sound, a display for displaying various plots, graphs, etc., with the ability to flash the display or portions of the content being displayed, a light emitting element for emitting a light, a receiver for receiving communications, a transmitter for transmitting signals, and other similar features and hardware of a computer associated with mechanical testing systems.

Figure 2:
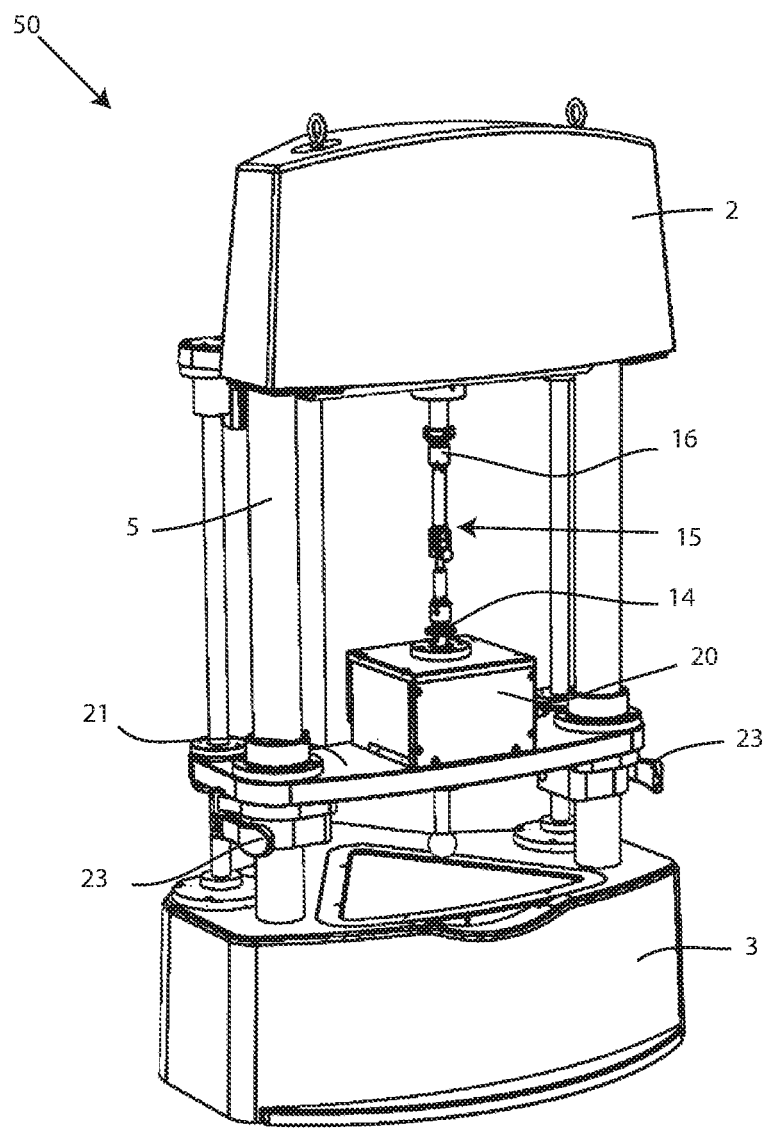
FIG. 2 depicts a perspective view of a mechanical testing device, in accordance with embodiments of the present invention.

Embodiments of the error compensation system 100 may include a mechanical testing device 50, coupled to the computing system 120. FIG. 2 depicts a perspective view of a mechanical testing device 50, in accordance with embodiments of the present invention. Embodiments of mechanical testing device 50 may be a mechanical testing system a testing device, a sample tester, a properties analyzer for various specimens, a test instrument, a mechanical testing instrument, a device for testing samples, or any device for testing, measuring, and/or calculating a physical property, parameter, or characteristic of a physical specimen or section of material. In an exemplary embodiment, the mechanical testing device 50 may be used for calculating a stiffness of a particular sample. Moreover, embodiments of the mechanical testing device 50 may include a frame 5, which may be a general support structure of the mechanical testing device 50. The frame 5 may include an upper housing 2 and a lower housing 3. An actuator may be positioned within the upper housing 3 apply mechanical load on a reference sample 15 (or specimen during a test operation of a material). Embodiments of the actuator may be an electromagnetic motor, pneumatic actuator, hydraulic actuator, a screw driven linear actuator, and the like. Loading modes may be axial or torsional. A first sensor 10 (as depicted schematically in FIG. 1) may also be positioned within the upper housing 2. For instance, the first sensor 10 may be a displacement sensor that measures a displacement of the actuator during application of a load over a given period of time. Embodiments of the first sensor 10 may be communicatively coupled to the computing system 120, as described in greater detail infra.

Further, embodiments of the mechanical testing device 50 may include a first fixture 16 and a second fixture 14 positioned between the upper housing 2 and the lower housing 2. Embodiments of the first fixture 16 and the second fixture 14 may be a fixture, a holder, a grip, a sample or specimen retention element, a sample/specimen holder, and the like, for securing the ends of reference sample 15 disposed between the fixtures 16, 14. A distance between the fixtures 16, 14 may be adjusted to secure the reference sample 15 between the fixtures 16, 15, by manipulating one or more clamps 23 to raise or lower a stage 21 of the mechanical testing device 50. Embodiments of the mechanical testing device 50 may also include a second sensor 20. Embodiments of the second sensor 20 may be a load sensor for measuring a force of an applied load by the actuator over a given period of time. Embodiments of the second sensor 10 may be communicatively coupled to the computing system 120, as described in greater detail infra. In an exemplary embodiment, the second sensor 20 may be positioned below the second fixture, as shown in FIG. 2. However, embodiments of the second sensor 20 may be positioned above the first fixture 16.

Referring back to FIG. 1, embodiments of the mechanical testing device 50 may be communicatively coupled to the computing system 120. For instance, the mechanical testing device 50 may be coupled to a processor 141 of the computing system 120. Sensors 10, 20 of the mechanical testing device 50 may be communicatively coupled to the computing system 120 via an I/O interface 150. The sensors 10, 20 may be connected via an I/O interface 150 to computer system 120. The number of sensors 10, 20 connecting to computer system 120 via data bus lines 155a, 155b (referred to collectively as "data bus lines 155) may vary from embodiment to embodiment, depending on the parameters of a specimen or testing system being tested. As shown in FIG. 1, a sensors 10, 20 (e.g. a displacement sensor 10 and load sensor 20) may transmit data or signals (e.g. "feedback data") received from the sensors 10, 20 by connecting to computing system 120 via the data bus lines 155 to an I/O interface 150. An I/O interface 150 may refer to any communication process performed between the computer system 120 and the environment outside of the computer system 120, for example, the sensors 10, 20 and mechanical testing device 50 via data bus line 155c. Input to the computing system 120 may refer to the signals or instructions sent to the computing system 120, for example the data signals collected by the sensors 10, 20, while output may refer to the signals sent out from the computer system 120 to the mechanical testing device 50, such as a signal to actuate the actuator/motor of the mechanical testing device 50.

Furthermore, embodiments of the computing system 120 may be equipped with a memory device 142 which may store various data/information/code, and a processor 141 for implementing the tasks associated with the error compensation system 100. In some embodiments, an error compensation application 130 may be loaded in the memory device 142 of the computing system 120. The computing system 120 may further include an operating system, which can be a computer program for controlling an operation of the computing system 120, wherein applications loaded onto the computing system 120 may run on top of the operating system to provide various functions. Furthermore, embodiments of computing system 120 may include the error compensation application 130. Embodiments of the error compensation application 130 may be an interface, an application, a program, a module, or a combination of modules. In an exemplary embodiment, the error compensation application 130 may be a software application running on one or more back end servers, servicing a user personal computer over a network (not shown), and/or may be a software application running on the user personal computing device. In an exemplary embodiment, the error compensation application 130 may be used in conjunction with testing for stiffness of a particular material sample.

The error compensation application 130 of the computing system 120 may include a load module 131, a filter module 132, a calculating module 133, and a comparing module 134. A "module" may refer to a hardware-based module, software-based module or a module may be a combination of hardware and software. Embodiments of hardware-based modules may include self-contained components such as chipsets, specialized circuitry and one or more memory devices, while a software-based module may be part of a program code or linked to the program code containing specific programmed instructions, which may be loaded in the memory device of the computing system 120. A module (whether hardware, software, or a combination thereof) may be designed to implement or execute one or more particular functions or routines.

Embodiments of the load module 131 may include one or more components of hardware and/or software program code for applying a load to the reference sample 15 for applying a mechanical load to a reference sample 15 mechanically coupled to the at least one fixture 14, 16 to obtain a load measurement signal from the load sensor 20 and a displacement measurement signal from the displacement sensor 10. For instance, embodiments of the load module 131 may receive a load measurement signal from a load sensor, such as sensor 20, of the mechanical testing device, and a displacement measurement signal from a displacement sensor, such as sensor 10, of the mechanical testing device 50, in response to an actuator of the mechanical testing device 50 applying a mechanical load to a reference sample 15 mechanically coupled to at least one fixture 14, 16 of the mechanical testing device 50. Embodiments of the mechanical load may be a static load, a quasi-static load, a dynamic load with a single frequency, a dynamic load with multiple discrete frequencies, and a dynamic load with pseudo-random broadband noise.

In an exemplary embodiment for determining a compensated value attributable to a deflection of a mechanical testing system, prior to testing for stiffness of an actual specimen, embodiments of the load module 131 may send instructions to the actuator to apply a quasi-static load (e.g. force (N)) over a given period of time. For example, the load module 131 of the computing system 120 may via processor 141 generate a digital waveform which is ultimately converted to a current applied to the electromagnetic motor (e.g. actuator) of the mechanical testing device 50 apply a mechanical load to the reference sample 15. In one embodiment, the applied load may be a plurality of sinusoidal excitations applied in succession or simultaneously, however, a single waveform may be generated for applying the load to the sample 15. As a result of the generated waveform from the load module 131, the actuator of the mechanical testing device 50 may exert a force (e.g. up to 50 N) over a period of time (e.g. 2-3 seconds). A load measurement signal may then be received from the load sensor 20 and a displacement measurement signal may then be received from the displacement sensor 10.

Figure 3A:
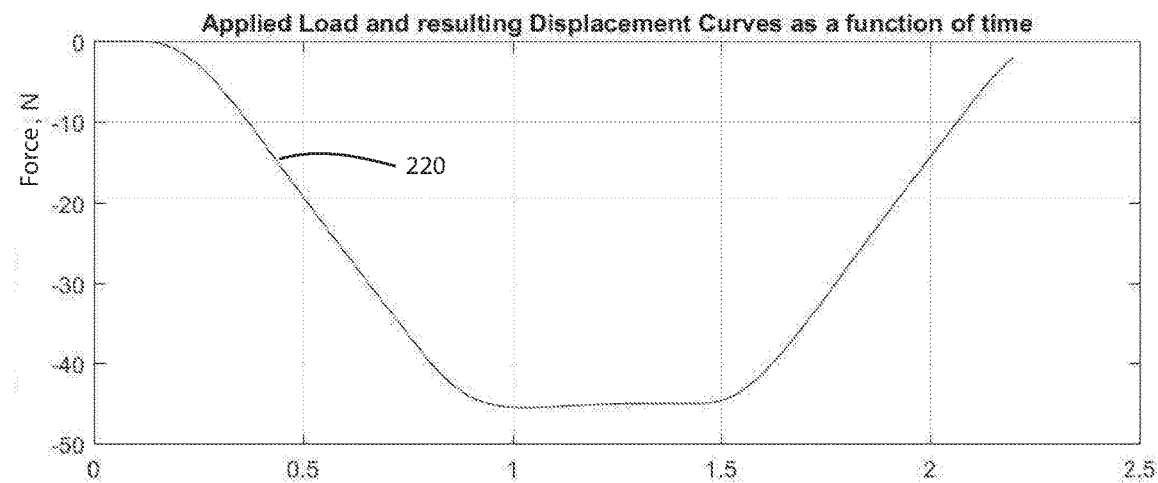
FIG. 3A depicts a graph of a load measurement signal received from a load sensor, in accordance with embodiments of the present invention.
Figure 3B:
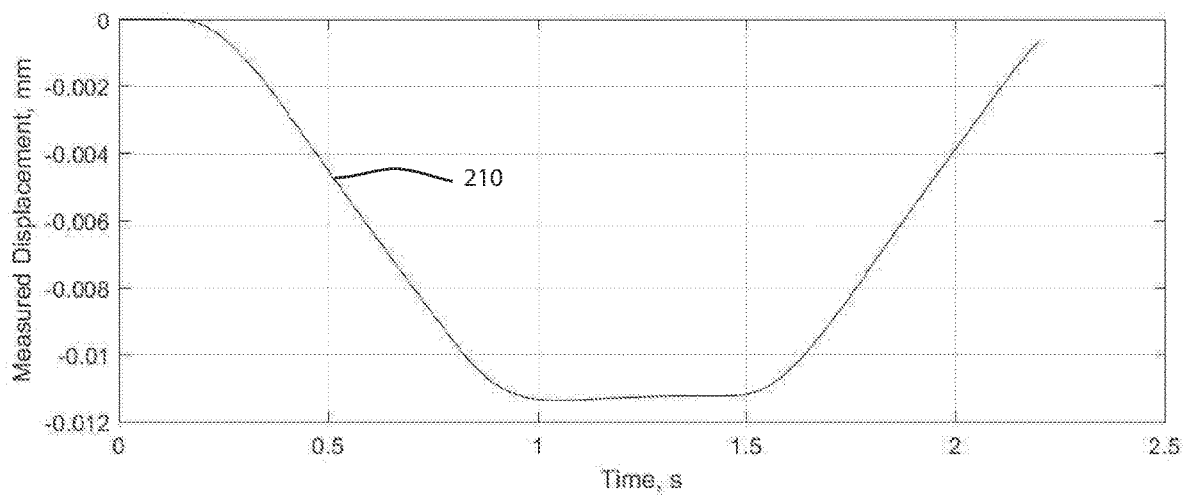
FIG. 3B depicts a graph of a displacement measurement signal received from a displacement sensor, in accordance with embodiments of the present invention.

FIG. 3A depicts a graph of a load measurement signal 220 received from a load sensor 20, in accordance with embodiments of the present invention. The load measurement signal 220 may be a time sample, showing that a force is applied starting at 0 N and increasing to approximately 45 N, holding at 45 N for about a half-second, and then decreasing the force back to 0 N. FIG. 3B depicts a graph of a displacement measurement signal 210 received from a displacement sensor 10, in accordance with embodiments of the present invention. The displacement signal 210 may be a time sample, showing that a displacement of the mechanical testing device 50 starts at 0 mm and increases to about 0.012 mm as the load is increased, over time, and eventually back to 0 mm. The load measurement signal 220 and the displacement measurement signal 210 depicted in FIGS. 3A and 3B are representative of a single, exemplary test for compliance or stiffness of the mechanical testing device 50.

Furthermore, the resultant load measurement signal 220 and the displacement measurement signal 210 received by the load module 131 of the computing system 120 in response to the applied load exerted onto the reference sample 15 may represent load and displacement data of the mechanical testing device 50 (i.e. components thereof). In other words, the load measurement signal 220 and displacement measurement signal may be assumed to only represent load and displacement data resulting from a deflection of the testing device 50, and not the reference sample 15, because the reference sample 15 is significantly stiffer or more rigid than the testing system 50. For instance, the reference sample 15 may be magnitudes more rigid than the components of the testing device 50, such that either the reference sample undergoes no deflection or displacement at the loads being exerted by the actuator, or that any deflection or displacement of the reference sample 15 is negligible compared to the displacement or deflection of the testing device 50. As an example, an overall stiffness of the testing device 50 may be 4000 N/m while the reference sample 15 may have a stiffness of 80000 N/m. In further embodiments, the sample 15 may have a known stiffness. Knowing the stiffness and the applied load, an expected deflection can be computed and compared to the actual measured deflection. The expectation being that the system deflection would be the difference between the expected deflection and the measured deflections.

Figure 4:
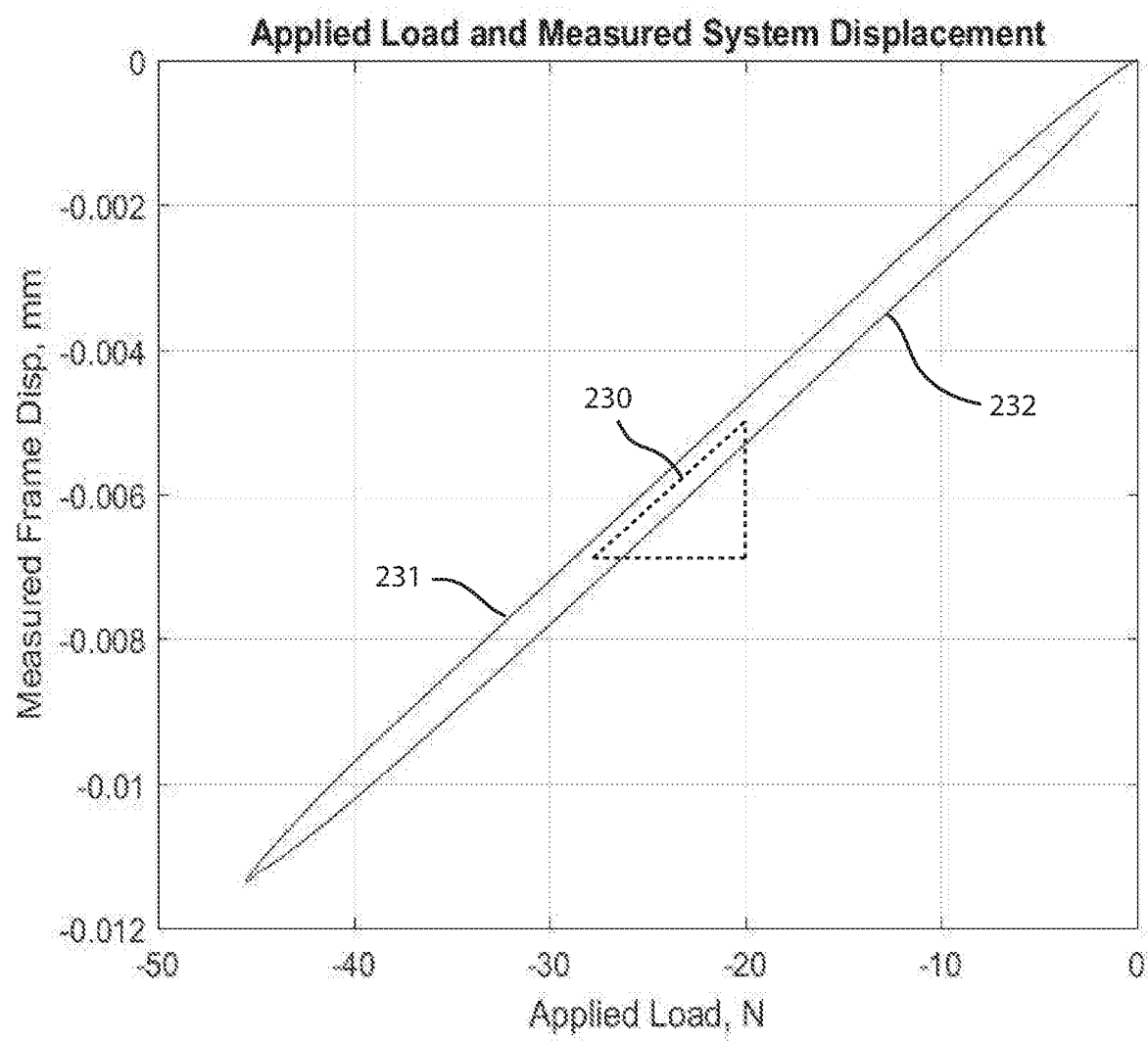
FIG. 4 depicts a graph of measured system displacement and applied load, in accordance with embodiments of the present invention

Referring back to FIGS. 1 and 3A-3B, the computing system 120 may utilize the load measurement signal 220 and the displacement measurement signal 210 to calculate a stiffness of the testing device 50. FIG. 4 depicts a graph of measured system displacement (mm) and applied load (N), in accordance with embodiments of the present invention. Computing system 120 may analyze the data received by the load module 131 from the sensors 10, 20 (e.g. load measurement signal and displacement signal) and using a data analysis technique, such as a least squares fit to calculate a slope 230 representing a stiffness or a compliance (1/stiffness) of the testing device 50. In some embodiments of the error compensation system 100, the computing system 120 may check to ensure a linearity of a slope 230 of the compliance/stiffness as part of a diagnostic check. If the slope is not linear, or a separation between a forward run 231 and a return run 232 exceeds a predetermined tolerance, the computing system 120 may send an error notification that the testing device 50 needs further calibration or will not produce accurate results.

Figure 5A:
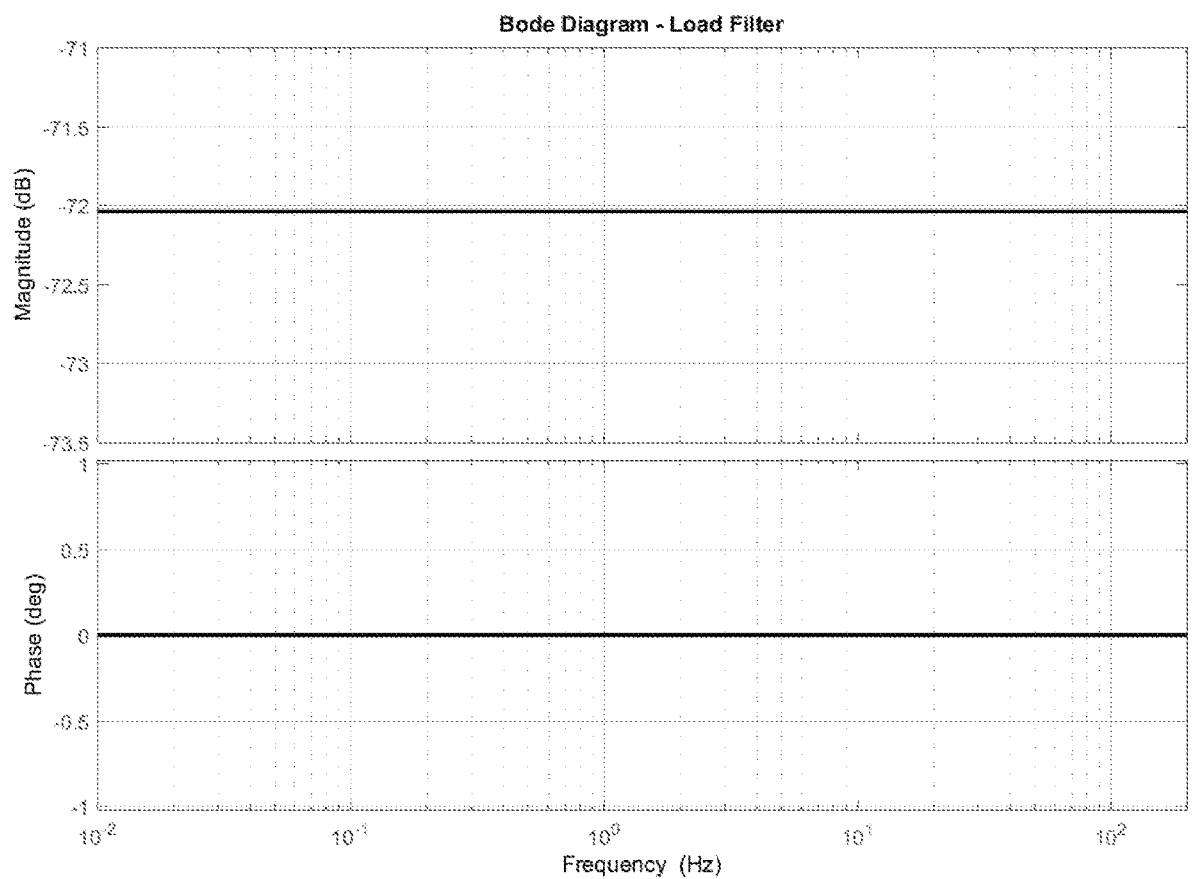
FIG. 5A depicts a graph representing the load filter as a Bode diagram, in accordance with embodiments of the present invention.
Figure 5B:
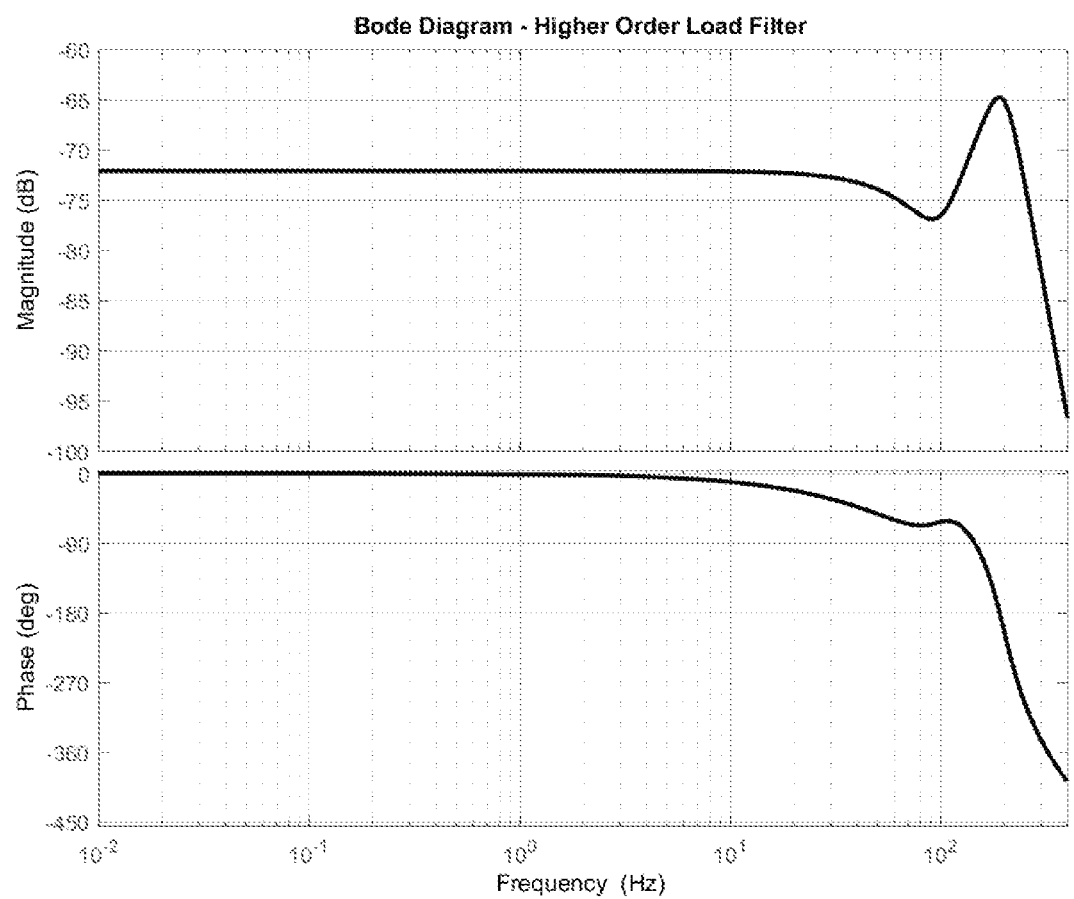
FIG. 5B depicts a graph representing a higher order load filter as a Bode diagram, in accordance with embodiments of the present invention.
Figure 6A:
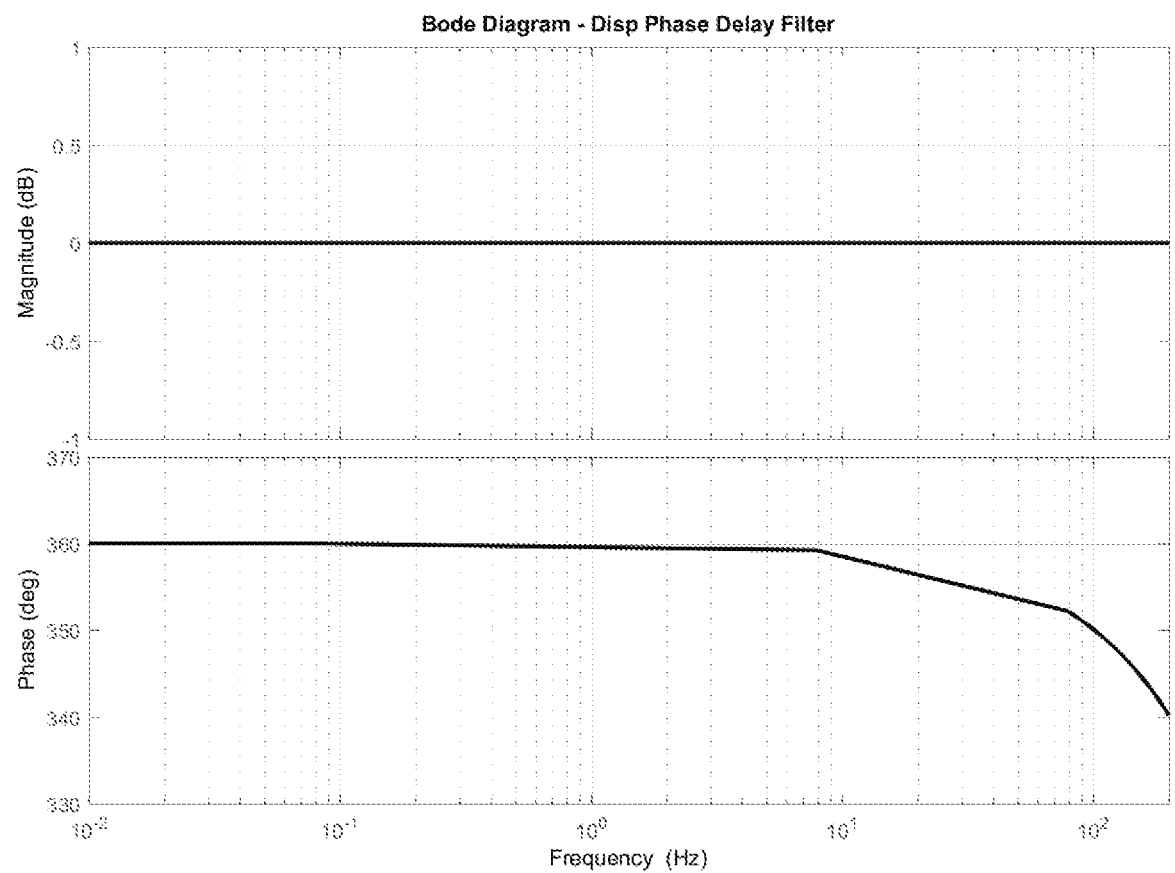
FIG. 6A depicts a graph representing the displacement filter as a Bode diagram, in accordance with embodiments of the present invention.
Figure 6B:
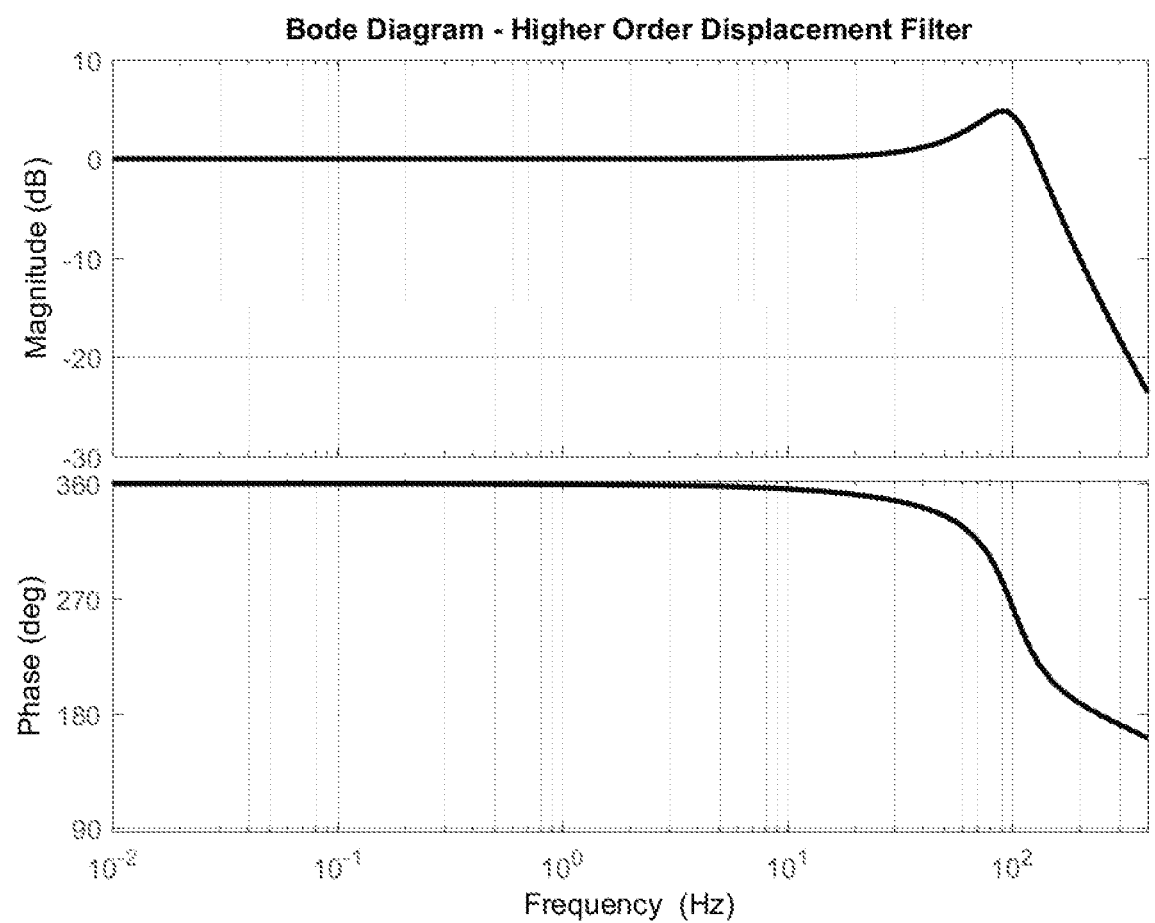
FIG. 6B depicts a graph representing a higher order displacement filter as a Bode diagram, in accordance with embodiments of the present invention.

Referring back to FIG. 1, embodiments of the computing system 120 may further include a filter module 132. Embodiments of the filter module 132 may include one or more components of hardware and/or software program code for creating a load filter (e.g. filter 240 shown in FIG. 7) and a displacement filter (e.g. filter 230 shown in FIG. 7) to be applied to the load measurement signal 220 and the displacement measurement signal 210, respectively, using a transfer function. For instance, embodiments of the filter module 132 of the computing system 120 may compute, calculate, derive, perform, etc. a transfer function converting the load measurement signal 220 and the displacement measurement signal 210 to a frequency domain to create a load filter 240 and a displacement filter 230 to be applied to the load measurement signal 220 and the displacement measurement signal 210, respectively. FIG. 5 depicts a graph representing the load filter 240 as a Bode diagram, in accordance with embodiments of the present invention. The Bode diagram in FIG. 5A depicts a constant magnitude (dB) 60 a constant phase (deg.), which means that the load filter 240 may be a gain only correction to be applied to the load measurement signal 220. In an exemplary embodiment, the load filter 240 applied to the load measurement signal 220 may have a gain equal to the slope of the displacement v. applied load depicted in FIG. 4. In other words, the load filter 240 may be the compliance of the system (mm/N), which may be applied to the load measurement signal 220 (e.g. load (N)×compliance (mm/N)) to arrive at a load compensation value 260 shown in FIG. 7. In further embodiments, a filter with inverse characteristics relative to some measured error as a function of frequency may be created and applied to the load measurement signal 220. FIG. 5B depicts a graph representing a higher order load filter as a Bode diagram, in accordance with embodiments of the present invention. FIG. 6 depicts a graph representing the displacement filter 230 as a Bode diagram, in accordance with embodiments of the present invention. The Bode diagram in FIG. 6A depicts a constant magnitude (dB), but a phase (deg.) value that changes as the frequency (Hz) increases, which means that the displacement filter 230 may be a displacement phase delay to synchronize the displacement measurement signal 210 and the load measurement signal 220, which may be applied to the displacement measurement signal 210. In further embodiments, a filter with inverse characteristics relative to some measured error as a function of frequency may be created and applied to the displacement measurement signal 210. FIG. 6B depicts a graph representing a higher order displacement filter as a Bode diagram, in accordance with embodiments of the present invention. The two filters depicted in FIGS. 5B and 6B can be designed such that a standard filter (e.g. one of the filters shown in FIGS. 5A and 6A) can be implemented on one channel, and the alternate filter (e.g. one of the filters shown in FIGS. 5B and 6B) on the other channel, but not both alternates together. For example, the load filter 240 shown in FIG. 5A may be used with the displacement filter 230, or vice versa. However, alternate designs for the filters shown in FIGS. 5B and 6B could be produced where higher order filters are used for both the displacement filter 230 and the load filter 240.

Embodiments of the filter module 132 may create a filter configured to compensate for variations in the system response as a function of frequency. For example, a system resonance causing errors in the measurement of sample stiffness as well as a variation in a phasing of the load measurement signal and the displacement measurement signal could be detected in a testing frequency range and the filters may be designed to compensate for that resonance. The information required to design these filters could be gathered by running a plurality of frequencies, such as a dynamic load with multiple discrete frequencies, or a dynamic load with pseudo-random broadband noise. In addition, any other irregularities in the load or displacement measurement signals as a function of frequency may be compensated for. In one embodiment, a phase delay in the load and/or displacement measurement signal path may be assessed and compensated such that the load measurement signal and the displacement measurement signal match in phase or have some desired phase ratio or phase relationship.

Figure 7:
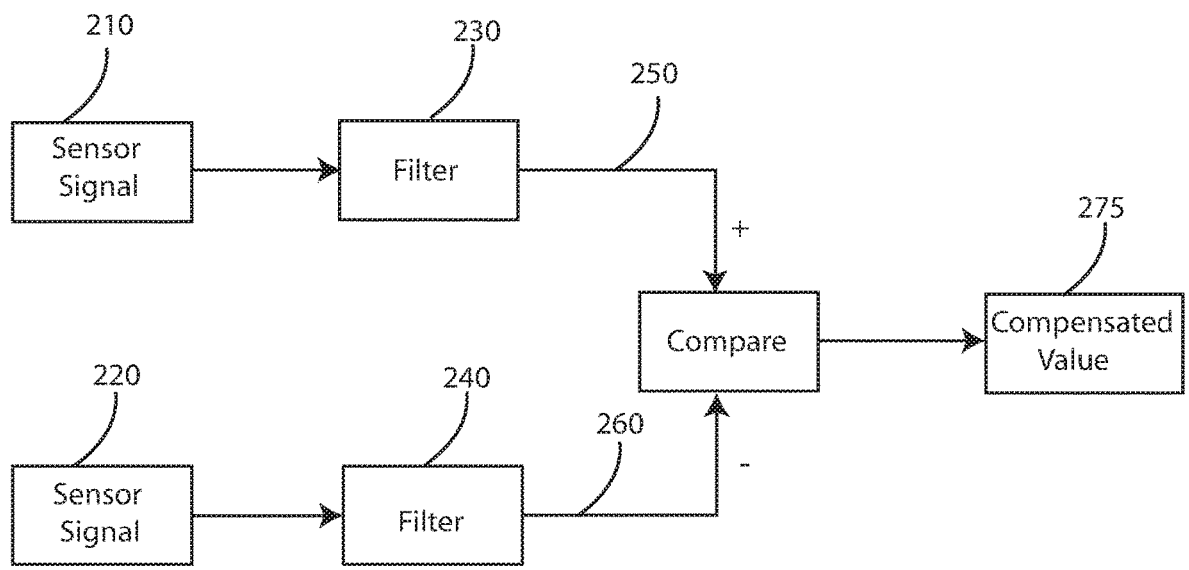
FIG. 7 depicts a block diagram for error compensation to determine a compensated value attributable to the mechanical testing device, in accordance with embodiments of the present invention.

Referring again to FIG. 1, embodiments of the computing system 120 may also include a calculating module 133. Embodiments of the calculating module 133 may include one or more components of hardware and/or software program code for calculating a load compensation value 260 by applying the load filter 240 to the load measurement signal 220, and a displacement compensation value 250 by applying the displacement filter 230 to the displacement measurement signal 210. For instance, embodiments of the calculating module 133 may apply the load filter 240 to the load measurement signal 220 to calculate a load compensation value 260, and the displacement filter 230 to the displacement measurement signal 210 to calculate a displacement compensation value 250. FIG. 7 depicts a block diagram for error compensation to determine a compensated value 275 attributable to the mechanical testing device 50, in accordance with embodiments of the present invention. Embodiments of the calculating module 133 may apply the load filter 240 to the load measurement signal 220 to calculate the load compensation value 260. In particular, the calculating module 133 may multiply the load measurement signal 220 in N with the slope 230 value defining the compliance of the mechanical testing device 50 in mm/N, which is the gain of the load filter 240. The resulting value in mm may be the load compensation value 260, to be used by the comparing module 134 of the computing system 120 to determine an overall compensated value 275 (e.g. deflection (mm)) of the mechanical testing system 50.

Moreover, the calculating module 133 may apply the displacement filter 230 to the displacement measurement signal 210 to calculate the load compensation value 250. In particular, the calculating module 133 may synchronize the displacement measurement signal and the load measurement signal (i.e. slow down the displacement measurement signal 210) by using the displacement filter 230 with a phase delay, because the displacement sensor 10 outputs over time are faster than the outputs over time from the load sensor 20. The resulting value in mm may be the displacement compensation value 260, to be used by the comparing module 134 of the computing system 120 to determine an overall compensated value 275 (e.g. deflection (mm)) of the mechanical testing system 50. In an exemplary embodiment, either load filter 240 or displacement filter 230 may have a gain and/or a phase value which are a function of frequency, such that the filters 230, 240 can correct for irregularities in the system.

Referring back to FIG. 1, and continued reference to FIG. 7, embodiments of the computing system 120 may include a comparing module 134. Embodiments of the comparing module 134 may include one or more components of hardware and/or software program code for comparing the load compensation value 260 with the displacement compensation value 250 to determine the compensated value 275 prior to testing a specimen (not shown) so that the compensated value 275 is used to automatically correct a measured deflection of the specimen to arrive at an actual specimen deflection. For instance, embodiments of the comparing module 134 may determine the compensated value 275 by comparing the load compensation value 260 with the displacement compensation value 250. Embodiments of the comparing module 134 of the computing system 120 may assign a negative value (e.g. −mm) to the load compensation value 260, and may assign a positive value (e.g. +mm) to the displacement compensation value 250. In an exemplary embodiment, the comparing module 134 may compare the compensated values 250, 260 by subtracting the displacement compensation value 250 in mm from the load compensation value 260 in mm to arrive at a final compensated value 275. Embodiments of the compensated value 275 may represent a total system (not reference sample 15) deflection in mm, that may be used for automatic correction to eliminate errors attributable to the system, in future test operations of a target specimen.

Figure 8:
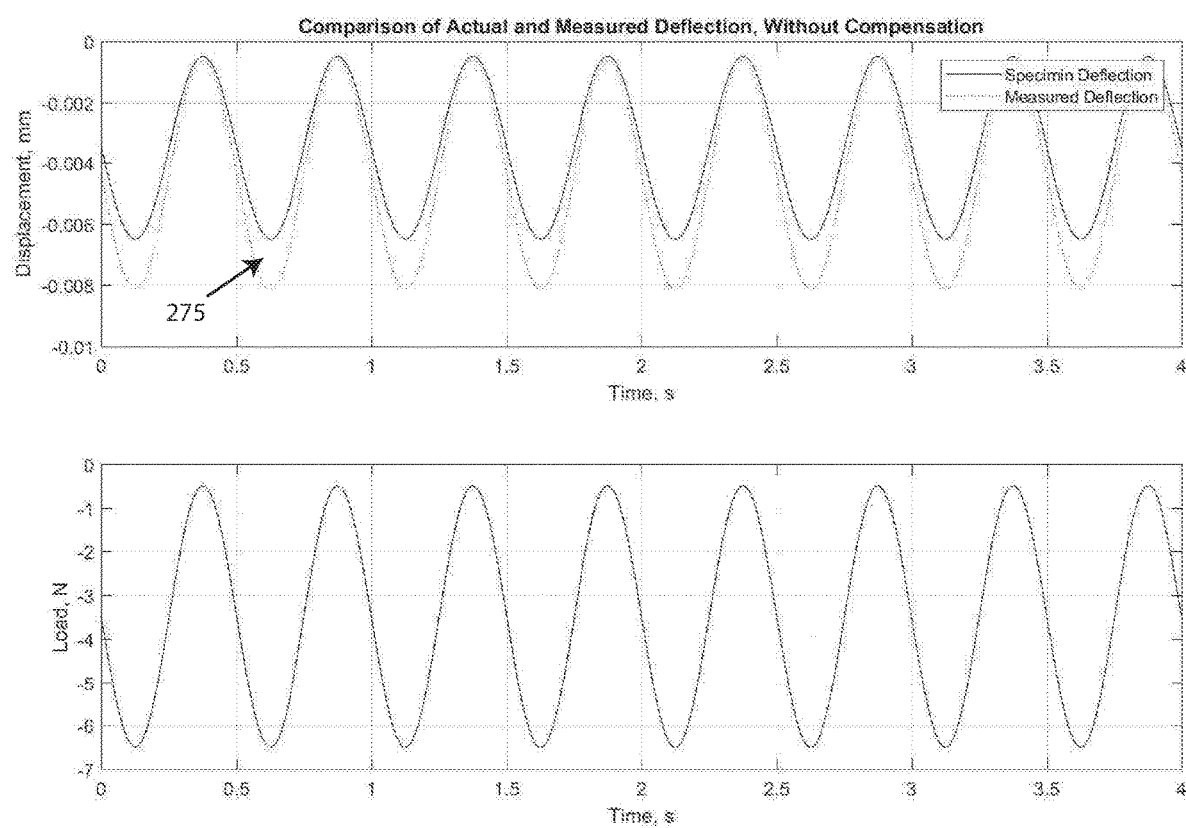
FIG. 8 graphically illustrates the compensated value that can be applied to correct a measured deflection of a specimen, in accordance with embodiments of the present invention.
Figure 9:
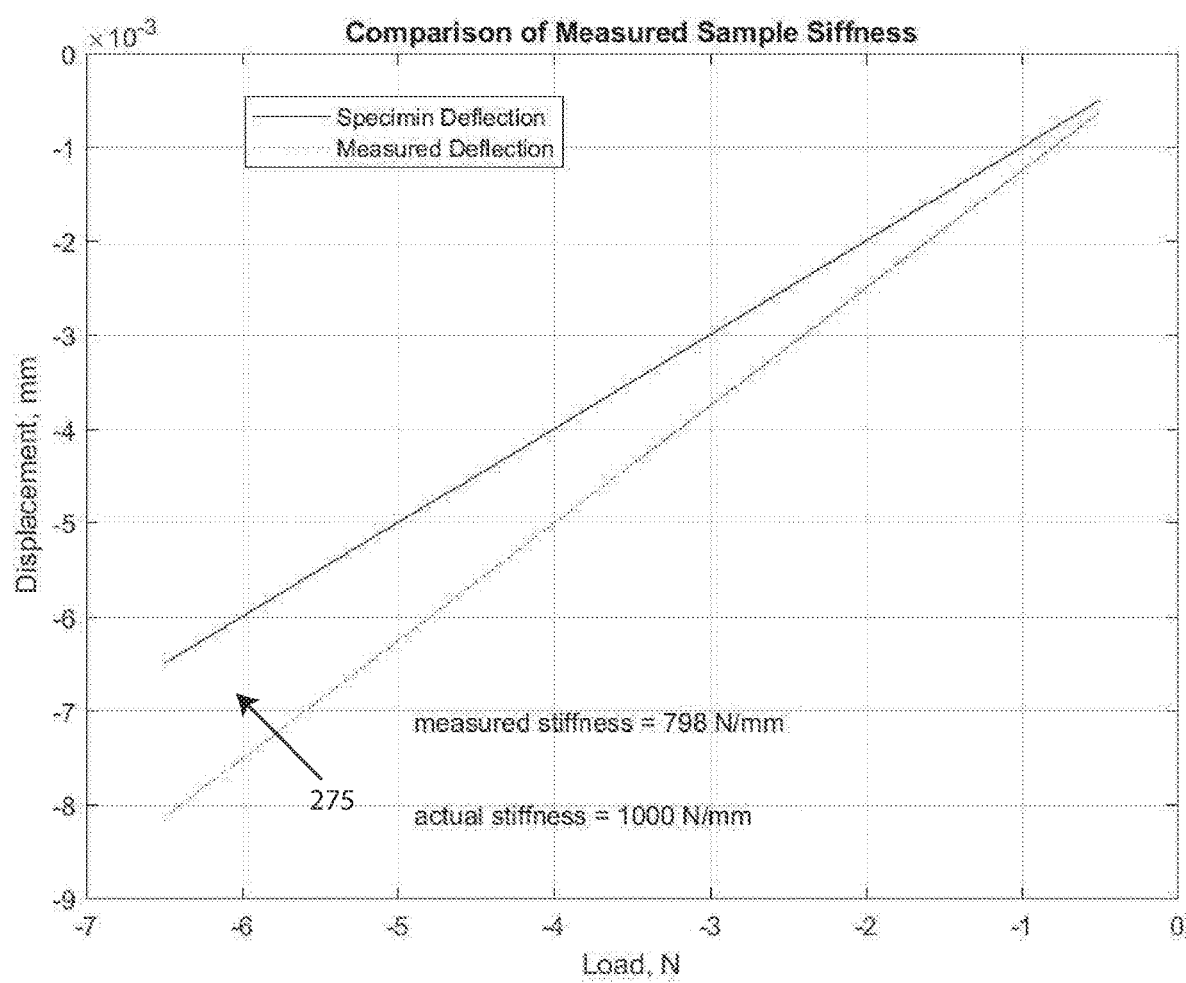
FIG. 9 graphically illustrates the compensated value that can be applied to correct a measured stiffness of a specimen, in accordance with embodiments of the present invention.

Specifically, the compensated value 275 may be determined prior to testing a specimen so that the compensated value 275 is used to automatically correct a measured deflection of the specimen to arrive at an actual specimen deflection. FIG. 8 graphically illustrates the compensated value 275 that can be applied to correct a measured deflection of a specimen, in accordance with embodiments of the present invention. For example, FIG. 8 depicts a waveform of displacement over time, depicting a measured deflection and an actual specimen deflection, in a test operation using a real specimen and not reference sample 15. As can be seen, the measured deflection is greater than the actual deflection of the specimen because deflection of the test system 50 adds to the overall measured deflection. However, by automatically applying the compensated value 275 to correct, modify, adjust, etc. the measured deflection, a testing system computing system, such as computing system 120, may determine an actual deflection of only the specimen, which leads to more accurate results from the test. Embodiments of the computing system 120 may automatically correct the measured deflection of the specimen, in response to performing methods described above. Likewise, FIG. 9 graphically illustrates the compensated value 275 that can be applied to correct a measured stiffness of a specimen, in accordance with embodiments of the present invention. As can be seen, the measured stiffness is less than the actual stiffness of the specimen because deflection of the test system 50 adds to the overall measured stiffness. However, by automatically applying the compensated value 275 to correct, modify, adjust, etc. the measured stiffness, a testing system computing system, such as computing system 120, may determine an actual stiffness of only the specimen, which leads to more accurate results from the test. Embodiments of the computing system 120 may automatically correct the measured stiffness of the specimen, in response to performing methods described above.

Various tasks and specific functions of the modules of the computing system 120 may be performed by additional modules, or may be combined into other module(s) to reduce the number of modules. Further, embodiments of the computer or computer system 120 may comprise specialized, non-generic hardware and circuitry (i.e., specialized discrete non-generic analog, digital, and logic-based circuitry) (independently or in combination) particularized for executing only methods of the present invention. The specialized discrete non-generic analog, digital, and logic-based circuitry may include proprietary specially designed components (e.g., a specialized integrated circuit, such as for example an Application Specific Integrated Circuit (ASIC), designed for only implementing methods of the present invention). Moreover, embodiments of the error compensation system 100 may improve mechanical testing technology by eliminating error attributed to the testing device, which can vary from test-to-test. For example, a user may replace fixtures depending on the material to be tested. The new fixtures may not have been calibrated with the system and thus may contribute to an overall displacement and/or deflection, which can skew the results of the test. Thus, the error compensation system 100 may be individualized to mechanical testing device and to each fixture used in mechanical testing procedures, by allowing a user to perform a relatively quick error estimation and correction operation, to determine an error attributable to the system, in particular a new fixture, prior to using the mechanical test device to test an actual specimen. Furthermore, the error compensation system 100 may improve the computing system 120 based on a set of rules that are applied to determine an error value regardless of the changes to the testing system. As shown in FIGS. 3A-9, rules are used to calculate and interpret various data received from physical sensor and hardware devices, testing a physical, real-world sample.

Figure 10:
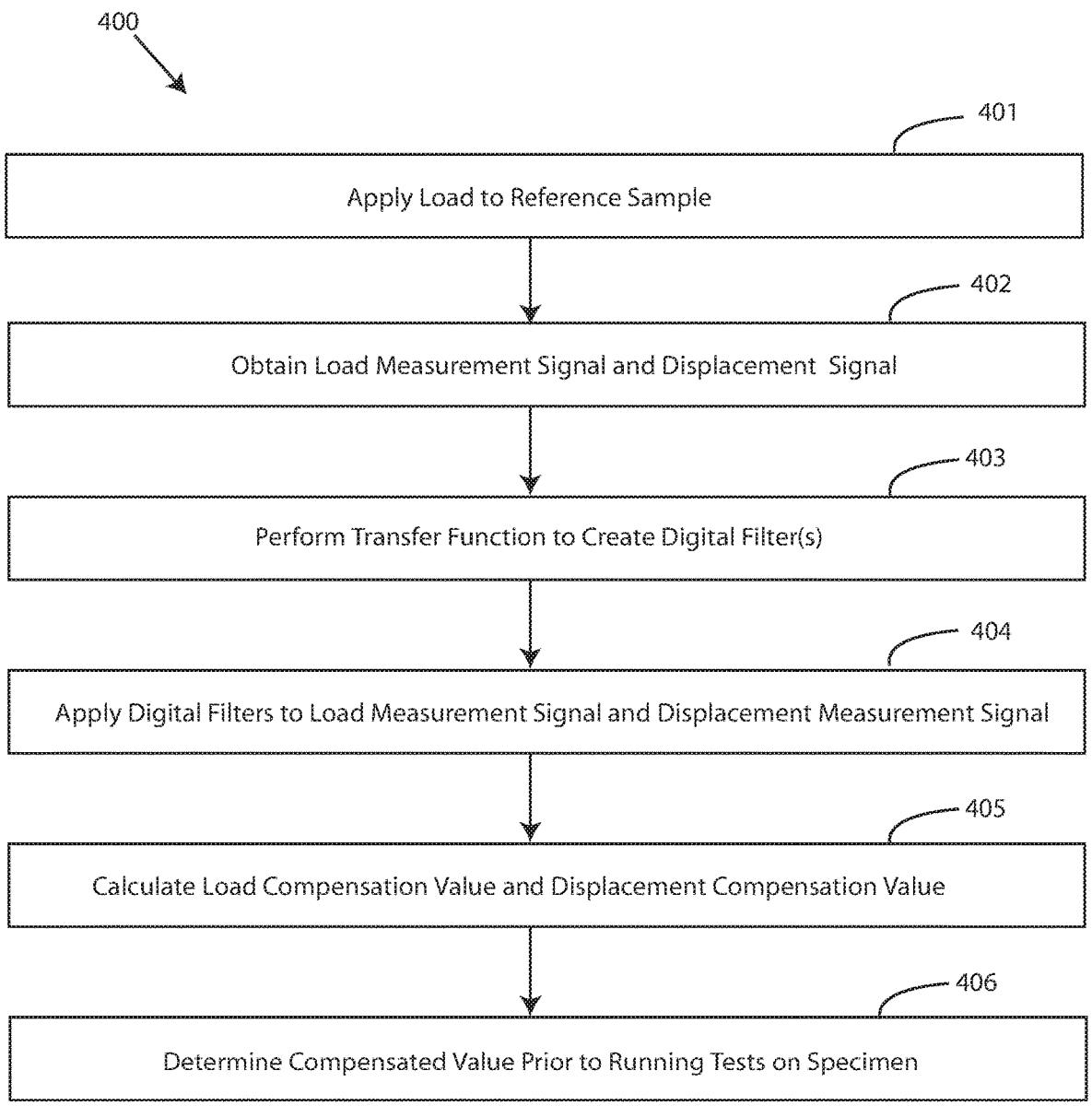
FIG. 10 depicts a flow chart of a method for determining a compensated value attributable to a deflection of a mechanical testing system, in accordance with embodiments of the present invention.

Referring now to FIG. 10, which depicts a flow chart of a method 400 for determining a compensated value attributable to a deflection of a mechanical testing system, in accordance with embodiments of the present invention. One embodiment of a method 400 or algorithm that may be implemented for determining a compensated value attributable to a deflection of a mechanical testing system with the error compensation system 100 described in FIGS. 1-9, using one or more computer systems as defined generically in FIG. 12 below, and more specifically by the specific embodiments of FIG. 1.

Embodiments of the method 400 for determining a compensated value attributable to a deflection of a mechanical testing system, in accordance with embodiments of the present invention, may begin at step 401 wherein a load is applied to a reference sample 15. For instance, an actuator of a mechanical testing device 50 may apply a mechanical load, such as a compression force, to the reference sample 15. Step 402 obtains a load measurement signal 220 using a load sensor 20 of the mechanical testing device 50, and a displacement measurement signal 210 using a displacement sensor 10. The data/signal may be transmitted to the computing system 120 from the sensors 10, 20. Step 403 calculates a transfer function to create digital filters to be applied to the load measurement signal 220 and the displacement measurement signal 210. Step 404 applies the filters to the load measurement signal 220 and the displacement signal 210. Based on the application of the filters, step 405 calculates a load compensation value 260 and a displacement compensation value 250. Step 406 determines a compensated value 275 using the load compensation value 260 and the displacement compensation value 250. The compensated value 275 may be determined prior to an end user using a mechanical testing system to perform tests on a specimen, so that the computing system 120 associated therewith can perform the automatic error corrections to a measured parameter to arrive at an actual parameter.

Embodiments of the error compensation system 100 may also determine dynamic properties of a testing system, such as mechanical testing device 50, either alone or in combination with determining static or quasi-static properties of the mechanical device 50, prior to a user running a test on an actual specimen. For example, mechanical losses (e.g., damping or inertial effects, backlash) can be assessed and corrected for following similar methods described above. Embodiments of the error compensation system 100 may analyze the applied loading/response data, as well as how the test system experiences the dynamic load(s) to be able to assess the quality of the supplied data and provide error reporting functionalities.

In a further embodiment, for a compression test where the fixture which applies load to the reference sample 15 may not start in contact, there may be initial ringing detected in the signal which could affect the measurement/analysis results. In this case, the computing system 120 may be designed to ignore data until the ringing effects are damped to a lower level, and the fixture can be assessed only when the fixture is in good contact with the reference sample 15.

Additionally, after the analysis is complete, some measure of the quality of the may be made. For example, where a simple linear fit is used, two parameters are monitored: the $R^2$ value of the fit itself, and the variation in total between the linear fit and a higher order fit. An assumption may be made that if the higher order fit is significantly more accurate (i.e. has lower error), then the linear fit may not sufficiently model the behavior. While it would be possible to use the higher order fit, at this time, it is assumed that a linear relationship between load and displacement is expected. If a significantly non-linear relationship exists, then the operator should verify the system and fixtures. In this case, the computing system 120 may indicate an issue to the user.

Accordingly, values specific to a user's exact test set-up can be calculated or ascertained quickly, usually within less than a couple of minutes, including the physical set up of the fixtures and reference sample. In addition, embodiments of the error correction system 100 gives the user a tool to quickly assess the quality of the user's test set-up and warn or potential issues (e.g., loose fasters or fixtures could easily be detected) before running lengthy tests.

Figure 11:
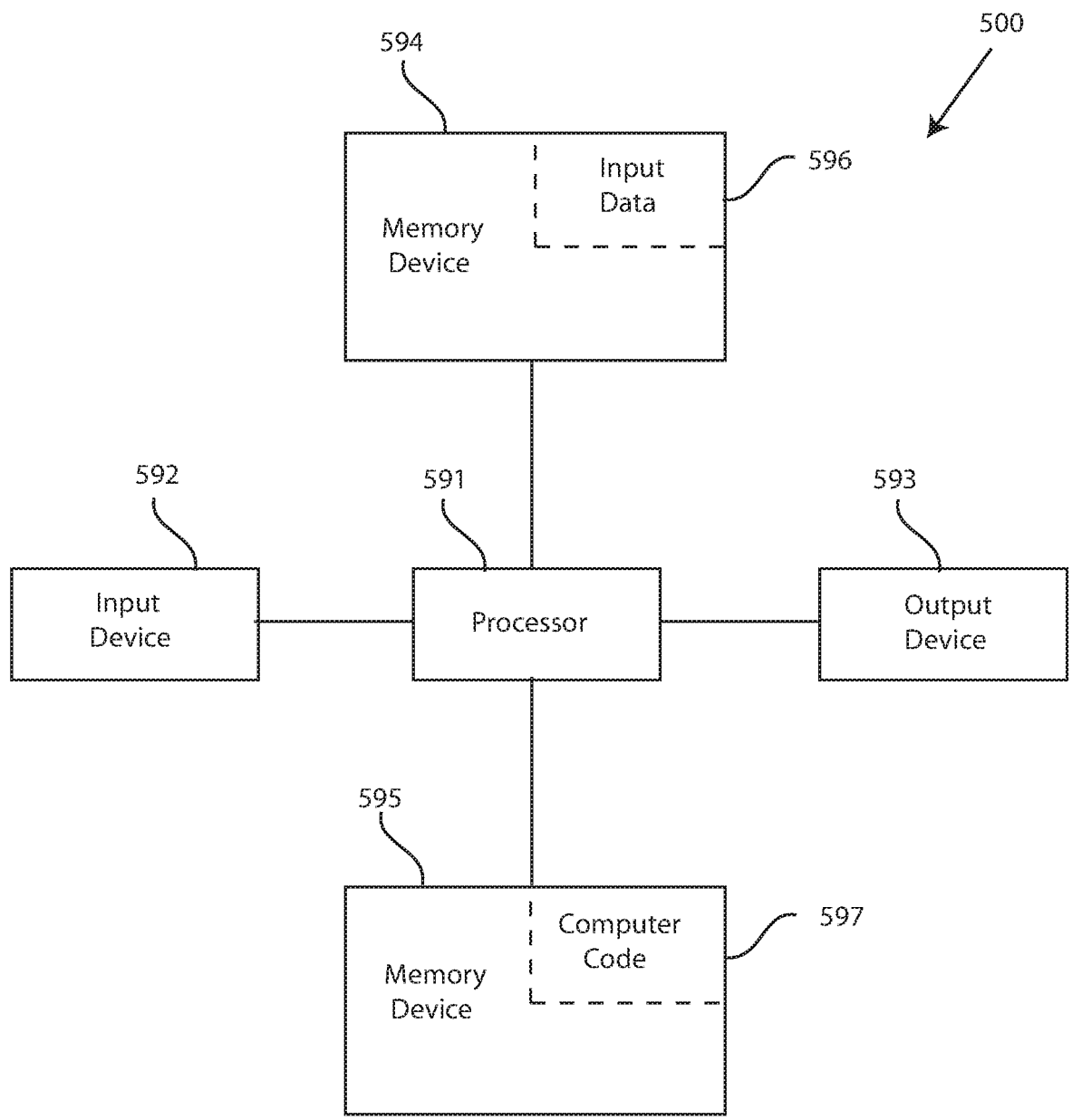
FIG. 11 depicts a block diagram of a computer system for the error compensation system of FIGS. 1-9, capable of implementing for determining a compensated value attributable to a deflection of a mechanical testing system of FIG. 10, in accordance with embodiments of the present invention.

FIG. 11 depicts a block diagram of a computer system for the error compensation system 100 of FIGS. 1-9, capable of implementing methods for determining a compensated value attributable to a deflection of a mechanical testing system of FIG. 10, in accordance with embodiments of the present invention. The computer system 500 may generally comprise a processor 591, an input device 592 coupled to the processor 591, an output device 593 coupled to the processor 591, and memory devices 594 and 595 each coupled to the processor 591. The input device 592, output device 593 and memory devices 594, 595 may each be coupled to the processor 591 via a bus. Processor 591 may perform computations and control the functions of computer system 500, including executing instructions included in the computer code 597 for the tools and programs capable of implementing a method for determining a compensated value attributable to a deflection of a mechanical testing system in the manner prescribed by the embodiments of FIG. 10 using the error compensation system 100 of FIGS. 1-9, wherein the instructions of the computer code 597 may be executed by processor 591 via memory device 595. The computer code 597 may include software or program instructions that may implement one or more algorithms for implementing the method for determining a compensated value attributable to a deflection of a mechanical testing system, as described in detail above. The processor 591 executes the computer code 597. Processor 591 may include a single processing unit, or may be distributed across one or more processing units in one or more locations (e.g., on a client and server).

The memory device 594 may include input data 596. The input data 596 includes any inputs required by the computer code 597. The output device 593 displays output from the computer code 597. Either or both memory devices 594 and 595 may be used as a computer usable storage medium (or program storage device) having a computer-readable program embodied therein and/or having other data stored therein, wherein the computer-readable program comprises the computer code 597. Generally, a computer program product (or, alternatively, an article of manufacture) of the computer system 500 may comprise said computer usable storage medium (or said program storage device).

Memory devices 594, 595 include any known computer-readable storage medium, including those described in detail below. In one embodiment, cache memory elements of memory devices 594, 595 may provide temporary storage of at least some program code (e.g., computer code 597) in order to reduce the number of times code must be retrieved from bulk storage while instructions of the computer code 597 are executed. Moreover, similar to processor 591, memory devices 594, 595 may reside at a single physical location, including one or more types of data storage, or be distributed across a plurality of physical systems in various forms. Further, memory devices 594, 595 can include data distributed across, for example, a local area network (LAN) or a wide area network (WAN). Further, memory devices 594, 595 may include an operating system (not shown) and may include other systems not shown in FIG. 11.

In some embodiments, the computer system 500 may further be coupled to an Input/output (I/O) interface and a computer data storage unit. An I/O interface may include any system for exchanging information to or from an input device 592 or output device 593. The input device 592 may be, inter alia, a keyboard, a mouse, etc. The output device 593 may be, inter alia, a printer, a plotter, a display device (such as a computer screen), a magnetic tape, a removable hard disk, a floppy disk, etc. The memory devices 594 and 595 may be, inter alia, a hard disk, a floppy disk, a magnetic tape, an optical storage such as a compact disc (CD) or a digital video disc (DVD), a dynamic random access memory (DRAM), a read-only memory (ROM), etc. The bus may provide a communication link between each of the components in computer 500, and may include any type of transmission link, including electrical, optical, wireless, etc.

An I/O interface may allow computer system 500 to store information (e.g., data or program instructions such as program code 597) on and retrieve the information from computer data storage unit (not shown). Computer data storage unit includes a known computer-readable storage medium, which is described below. In one embodiment, computer data storage unit may be a non-volatile data storage device, such as a magnetic disk drive (i.e., hard disk drive) or an optical disc drive (e.g., a CD-ROM drive which receives a CD-ROM disk). In other embodiments, the data storage unit may include a knowledge base or data repository 125 as shown in FIG. 1.

As will be appreciated by one skilled in the art, in a first embodiment, the present invention may be a method; in a second embodiment, the present invention may be a system; and in a third embodiment, the present invention may be a computer program product. Any of the components of the embodiments of the present invention can be deployed, managed, serviced, etc. by a service provider that offers to deploy or integrate computing infrastructure with respect to error compensation systems and methods. Thus, an embodiment of the present invention discloses a process for supporting computer infrastructure, where the process includes providing at least one support service for at least one of integrating, hosting, maintaining and deploying computer-readable code (e.g., program code 597) in a computer system (e.g., computer system 500) including one or more processor(s) 591, wherein the processor(s) carry out instructions contained in the computer code 597 causing the computer system to determine a compensated value attributable to a deflection of a mechanical testing system. Another embodiment discloses a process for supporting computer infrastructure, where the process includes integrating computer-readable program code into a computer system 500 including a processor.

The step of integrating includes storing the program code in a computer-readable storage device of the computer system 500 through use of the processor. The program code, upon being executed by the processor, implements a method for determining a compensated value attributable to a deflection of a mechanical testing system. Thus, the present invention discloses a process for supporting, deploying and/or integrating computer infrastructure, integrating, hosting, maintaining, and deploying computer-readable code into the computer system 500, wherein the code in combination with the computer system 500 is capable of performing a method for determining a compensated value attributable to a deflection of a mechanical testing system.

A computer program product of the present invention comprises one or more computer-readable hardware storage devices having computer-readable program code stored therein, said program code containing instructions executable by one or more processors of a computer system to implement the methods of the present invention.

A computer system of the present invention comprises one or more processors, one or more memories, and one or more computer-readable hardware storage devices, said one or more hardware storage devices containing program code executable by the one or more processors via the one or more memories to implement the methods of the present invention.

The present invention may be a system, a method, and/or a computer program product at any possible technical detail level of integration. The computer program product may include a computer-readable storage medium (or media) having computer-readable program instructions thereon for causing a processor to carry out aspects of the present invention.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer-readable program instructions from the network and forwards the computer-readable program instructions for storage in a computer-readable storage medium within the respective computing/processing device.

Computer-readable program instructions for carrying out operations of the present invention may be assembler instructions, instruction-set-architecture (ISA) instructions, machine instructions, machine-dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer-readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer-readable program instructions by utilizing state information of the computer-readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer-readable program instructions.

These computer-readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions may also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the function/act specified in the flowchart and/or block diagram block or blocks.

The computer-readable program instructions may also be loaded onto a computer, other programmable data processing apparatus, or other device to cause a series of operational steps to be performed on the computer, other programmable apparatus or other device to produce a computer-implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A method for determining a compensated value attributable to a deflection of a mechanical testing system, the mechanical testing system including at least one fixture, a frame, a load sensor, and a displacement sensor, the method comprising:

applying, by the mechanical testing system, a mechanical load to a reference sample mechanically coupled to the at least one fixture to obtain a load measurement signal from the load sensor and a displacement measurement signal from the displacement sensor;

calculating, by the mechanical testing system, a transfer function converting the load measurement signal and the displacement measurement signal measured in a time domain into signals in a frequency domain to create a load filter and a displacement filter to be applied to the load measurement signal and the displacement measurement signal, respectively, wherein the load filter and the displacement filter are configured to compensate for a deflection of at least one of the frame, the load sensor and the at least one fixture;

applying, by the mechanical testing system, the load filter to the load measurement signal to calculate a load compensation value that is calculated by modifying the load measurement signal with a compliance of the mechanical testing system and compensates for a deflection of the mechanical testing system, wherein the deflection includes deflection of at least one of the frame and the at least one fixture;

applying, by the mechanical testing system, the displacement filter to the displacement measurement signal to calculate a displacement compensation value that compensates for a displacement of the mechanical testing system and accounts for a phase delay in the displacement measurement signal relative to the load measurement signal, wherein the displacement includes displacement of at least one of the frame and the at least one fixture;

determining, by the mechanical testing system, a compensated value which represents a total deflection of the mechanical testing system by comparing the load compensation value with the displacement compensation value, wherein the compensated value is determined prior to testing a specimen so that the compensated value is used to automatically correct a measured deflection of the specimen to arrive at an actual specimen deflection;

applying, by the mechanical testing system, a mechanical load to the specimen;

measuring, by the mechanical testing system, deflection of the specimen by the mechanical test system; and automatically correcting, by the mechanical testing system, the measured deflection of the specimen, by using the compensated value.

2. The method of claim 1, wherein the reference sample is more rigid than the mechanical testing system, such that a deflection of the reference sample under the applied load is negligible compared to the deflection of the mechanical testing system.

3. The method of claim 1, wherein the displacement filter is a displacement phase delay to synchronize the displacement measurement signal and the load measurement signal.

4. The method of claim 1, wherein the load filter is a gain equal to a slope of a measured compliance of the mechanical testing system, and the load filter is applied to the load measurement signal by multiplying the slope (mm/N) and the load measurement signal (N).

5. The method of claim 1, further comprising:
applying a phase delay to the load measurement signal.

6. The method of claim 1, further comprising:
applying a gain to the displacement measurement signal.

7. The method of claim 1, further comprising:
applying a phase delay and a gain to the load measurement signal.

8. The method of claim 1, further comprising:
applying a phase delay and a gain to the displacement measurement signal.

9. The method of claim 1, wherein the displacement filter is a higher-order filter.

10. The method of claim 1, wherein the load filter is a higher-order filter.

11. The method of claim 1, wherein the load filter and the displacement filter are configured to compensate for a deflection that includes a sum of a deflection of the frame, a deflection of the load sensor, and a deflection of the at least one fixture.

12. The method of claim 1, wherein the at least one fixture is replaceable with a different fixture having a different deflection than a deflection of the at least one fixture.

13. The method of claim 1, wherein the specimen is a material desired to be tested for stiffness, using the mechanical testing system, which is different from the reference sample.

14. A method for determining a compensated value attributable to a deflection of a mechanical testing system, the method comprising:
receiving, by a processor of a computing system, a load measurement signal from a load sensor of the mechanical testing system, and a displacement measurement signal from a displacement sensor of the mechanical testing system, in response to an actuator of the mechanical testing system applying a mechanical load to a reference sample mechanically coupled to at least one fixture of the mechanical testing system;
creating, by the processor, a load filter and a displacement filter, respectively, using a transfer function, the load filter and the displacement filter to be applied to the load measurement signal and the displacement measurement signal, wherein the load filter and the displacement filter are configured to compensate for a deflection of at least one of the frame, the load sensor and the at least one fixture;
calculating, by the processor, a load compensation value that is calculated by modifying the load measurement signal with a compliance of the mechanical testing system and compensates for a deflection of the mechanical testing system, wherein the deflection includes deflection of at least one of the frame and the at least one fixture by applying the load filter to the load measurement signal, and a displacement compensation value that accounts for a phase delay in the displacement measurement signal relative to the load measurement signal by applying the displacement filter to the displacement measurement signal;
comparing, by the processor, the load compensation value with the displacement compensation value to determine a compensated value prior to testing a specimen which represents a total deflection of the mechanical testing system; and
automatically correcting, by the processor, a measured deflection of the specimen to arrive at an actual specimen deflection using the compensated value.

15. The method of claim 14, wherein the reference sample is more rigid than the mechanical testing system, such that a deflection of the reference sample under the applied load is negligible compared to the deflection of the mechanical testing system.

16. The method of claim 14, wherein the displacement filter is a displacement phase delay to synchronize the displacement measurement signal and the load measurement signal.

17. The method of claim 14, wherein the load filter is a gain equal to a slope of a measured compliance of the mechanical testing system, and the load filter is applied to the load measurement signal by multiplying the slope (mm/N) and the load measurement signal (N).

18. The method of claim 14, wherein the load filter and the displacement filter are configured to compensate for a deflection that includes a sum of a deflection of the frame, a deflection of the load sensor, and a deflection of the at least one fixture.

19. The method of claim 14, wherein the at least one fixture is replaceable with a different fixture having a different deflection than a deflection of the at least one fixture.

20. The method of claim 14, wherein the specimen is a material desired to be tested for stiffness, using the mechanical testing system, which is different from the reference sample.

21. A mechanical testing system comprising:
a mechanical testing device, the mechanical testing device including a load sensor and a displacement sensor;
a computing system coupled to the mechanical testing device, the computing system having a processor, a memory device coupled to the processor, and a computer readable storage device coupled to the processor;
wherein the storage device contains program code executable by the processor via the memory device to implement a method for determining a compensated value attributable to a deflection of the mechanical testing system, the method comprising:
receiving, by the processor, a load measurement signal from the load sensor, and a displacement measurement signal from the displacement sensor, in response to an actuator of the mechanical testing system applying a mechanical load to a reference sample mechanically coupled to at least one fixture of the mechanical testing system;
creating, by the processor, a load filter and a displacement filter, respectively, using a transfer function, the load filter and the displacement filter to be applied to the load measurement signal and the displacement measurement signal, wherein the load filter and the displacement filter are configured to compensate for a deflection of at least one of the frame, the load sensor and the at least one fixture;

calculating, by the processor, a load compensation value that is calculated by modifying the load measurement signal with a compliance of the mechanical testing system and compensates for a deflection of the mechanical testing system, wherein the deflection includes deflection of at least one of the frame and the at least one fixture by applying the load filter to the load measurement signal, and a displacement compensation value that accounts for a phase delay in the displacement measurement signal relative to the load measurement signal by applying the displacement filter to the displacement measurement signal;

comparing, by the processor, the load compensation value with the displacement compensation value to determine a compensated value prior to testing a specimen which represents a total deflection of the mechanical testing system; and automatically correcting, by the processor, a measured deflection of the specimen to arrive at an actual specimen deflection using the compensated value.

22. The mechanical testing system of claim 21, wherein the reference sample is more rigid than the mechanical testing system, such that a deflection of the reference sample under the applied load is negligible compared to the deflection of the mechanical testing system.

23. The mechanical testing system of claim 21, wherein the displacement filter is a displacement phase delay to synchronize the displacement measurement signal and the load measurement signal.

24. The mechanical testing system of claim 21, wherein the load filter is a slope of a measured compliance of the mechanical testing system, and the load filter is applied to the load measurement signal by multiplying the slope (mm/N) and the load measurement signal (N).

25. The mechanical testing system of claim 21, wherein the load filter and the displacement filter are configured to compensate for a deflection that includes a sum of a deflection of the frame, a deflection of the load sensor, and a deflection of the at least one fixture.

26. The mechanical testing system of claim 21, wherein the at least one fixture is replaceable with a different fixture having a different deflection than a deflection of the at least one fixture.

27. The mechanical testing system of claim 21, wherein the specimen is a material desired to be tested for stiffness, using the mechanical testing system, which is different from the reference sample.

28. A computer program product, comprising a computer readable hardware storage device storing a computer readable program code, the computer readable program code comprising an algorithm that when executed by a computer processor of a computing system implements a method for determining a compensated value attributable to a deflection of a mechanical testing system, the method comprising:

receiving, by a processor of a computing system, a load measurement signal from a load sensor of the mechanical testing system, and a displacement measurement signal from a displacement sensor of the mechanical testing system, in response to an actuator of the mechanical testing system applying a mechanical load to a reference sample mechanically coupled to at least one fixture of the mechanical testing system;

creating, by the processor, a load filter and a displacement filter, respectively, using a transfer function, the load filter and the displacement filter to be applied to the load measurement signal and the displacement measurement signal, wherein the load filter and the displacement filter are configured to compensate for a deflection of at least one of the frame, the load sensor and the at least one fixture;

calculating, by the processor, a load compensation value that is calculated by modifying the load measurement signal with a compliance of the mechanical testing system and compensates for a deflection of the mechanical testing system, wherein the deflection includes deflection of at least one of the frame and the at least one fixture by applying the load filter to the load measurement signal, and a displacement compensation value that accounts for a phase delay in the displacement measurement signal relative to the load measurement signal by applying the displacement filter to the displacement measurement signal;

comparing, by the processor, the load compensation value with the displacement compensation value to determine a compensated value prior to testing a specimen which represents a total deflection of the mechanical testing system; and automatically correcting, by the processor, a measured deflection of the specimen to arrive at an actual specimen deflection using the compensated value.

29. The computer program product of claim 28, wherein the reference sample is more rigid than the mechanical testing system, such that a deflection of the reference sample under the applied load is negligible compared to the deflection of the mechanical testing system.

30. The computer program product of claim 28, wherein the displacement filter is a displacement phase delay to synchronize the displacement measurement signal and the load measurement signal.

31. The computer program product of claim 28, wherein the load filter is a gain equal to a slope of a measured compliance of the mechanical testing system, and the load filter is applied to the load measurement signal by multiplying the slope (mm/N) and the load measurement signal (N).

32. The computer program product of claim 28, wherein the load filter and the displacement filter are configured to compensate for a deflection that includes a sum of a deflection of the frame, a deflection of the load sensor, and a deflection of the at least one fixture.

33. The computer program product of claim 28, wherein the at least one fixture is replaceable with a different fixture having a different deflection than a deflection of the at least one fixture.

34. The computer program product of claim 28, wherein the specimen is a material desired to be tested for stiffness, using the mechanical testing system, which is different from the reference sample.

* * * * *